United States Patent [19]

Iddings

[11] 3,754,475

[45] Aug. 28, 1973

[54] CONTROLLABLE PRECESSION GYROSCOPE

[75] Inventor: Lloyd A. Iddings, Arlington, Va.

[73] Assignee: The United States of America as represented by the Secretary of the Navy

[22] Filed: Jan. 10, 1972

[21] Appl. No.: 216,434

[52] U.S. Cl. .................................. 74/5.46, 74/5 F
[51] Int. Cl. ............................................. G01c 19/30
[58] Field of Search .......................... 74/5 F, 5.46; 308/2 A; 287/85 R

[56] References Cited
UNITED STATES PATENTS

| | | | |
|---|---|---|---|
| 2,916,919 | 12/1959 | Echolds | 74/5.46 |
| 3,498,146 | 3/1970 | Hulle et al. | 74/5.46 X |
| 3,543,301 | 11/1970 | Barnett | 74/5 F |
| 3,597,938 | 8/1971 | Hellen et al. | 308/2 A |
| 3,354,726 | 11/1967 | Krupick et al. | 74/5 F |

*Primary Examiner*—Manuel A. Antonakas
*Attorney*—R. S. Sciascia et al.

[57] ABSTRACT

A gyroscope for generating a drift rate for an optical lead computing gun sight including a particular flexure plate for mounting the gyroscope eddy-current disc and a four pole permanent magnet of a particular configuration which provides a fail-safe function in the device.

3 Claims, 6 Drawing Figures

PATENTED AUG 28 1973

3,754,475

CONTROLLABLE PRECESSION GYROSCOPE

BACKGROUND OF THE INVENTION

1. Field of the invention

The present invention relates to a gyroscope and more particularly to an eddy-current constrained gyroscope for a gun sight unit wherein a rotating reflecting mirror is used to provide lead angular deviations.

2. Description of the prior art

U. S. Pat. No. 2,916,919 to Echolds shows an inside-out gyroscope of the general type of the instant invention. One of the problems of manufacturing gyroscopes of this type, is the lack of compactness and economy of manufacture in the gimble ring arrangements which mount the eddy-current disc and the gyroscope rotor. Another problem is the heat buildup in this type of gryoscope due to the multitude of electromagnetic coils. A still further problem with the conventional gyroscopes as represented by the patented gyroscope referred to above, is that malfunction of the range coils makes the device inoperable. A difficulty with using multiple permanent magnets in gyroscopic devices, for example as shown in U.S. Pat. Nos. 2,368,644 and 2,390,532, is in obtaining and maintaining a constant and equal flux in all of the individual permanent magnets.

SUMMARY OF THE INVENTION

The present invention provides a gyroscope for generating a drift rate when optical lead computing gun sight which includes a flexure plate which is compact, economical to produce, with flexure qualities which are easy to control in the manufacturing process. The device also incorporates a permanent magnet having four poles of equal and relatively constant flux to produce a fail-safe gyroscopic device.

OBJECTS OF THE INVENTION

An object of the present invention is to produce a fail-safe gyroscope for generating a drift rate for an optical lead computing gun sight.

Another object is to prevent heat buildup in a gyroscopic device.

Another object is to produce an equal flux density in each of several poles of a gyroscopic device.

Still another object is to produce a compact gyroscope.

A still further object is to produce a gyroscope with a flexure joint of precise flexure qualities.

Other objects, advantages, and novel features of the present invention will become apparent from the following detailed description of the invention when considered in conjunction with the accompanying drawings.

DETAILED DESCRIPTION OF THE PREFERRED EMBODIMENT

Figure 1:
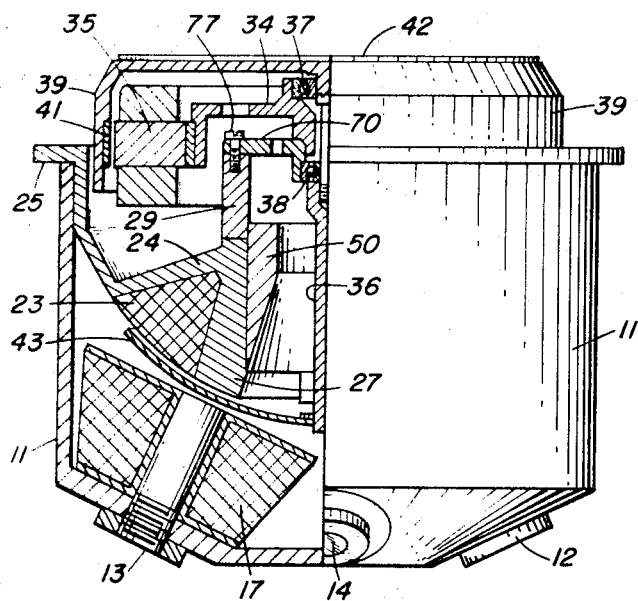
FIG. 1 is a partial cross-sectional view of the gyroscope.

Referring now to the drawings, wherein like reference characters designate like or corresponding parts throughout the several views, there is shown a casing 11 to which four outer soft iron deflection poles 12–15, inclusive, are inwardly directed. Each of the outer deflection poles 12–15 has a coil wound thereon, coil 16 (not shown) and 17 serving as elevation coils, and coil 18 and 19 (not shown) serving as azimuth coils.

Figure 6:
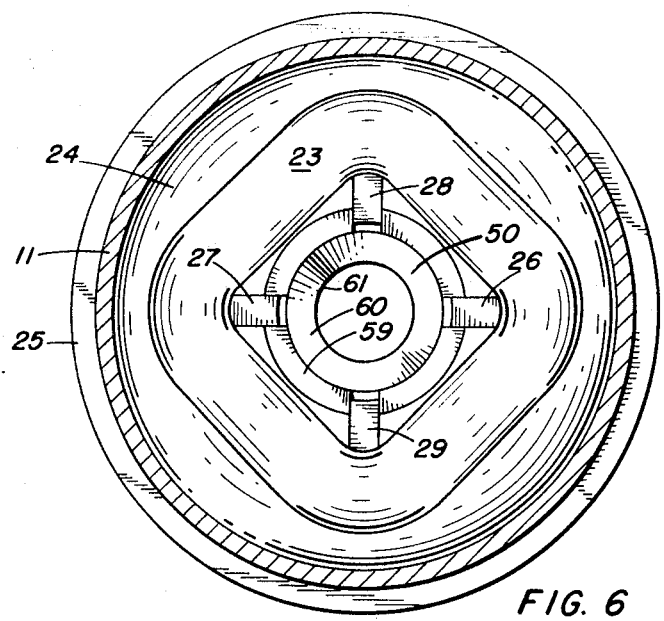
FIG. 6 is a bottom assembly view of one of the electro-magnetic coils, the permanent magnet, and a part of the housing.

The annular channel 24 has four inner pole sections 26–29 and each of these poles has its end in close proximity to one of the ends of the outer deflection poles 12–15. It can be seen there are only small air gaps between the outer and inner deflection poles, which provide a nearly closed flux path. The four poles 55–58 of the permanent magnet are interposed between the outer deflection poles 12–15. Range permanent magnet 50 consists generally of an annular portion 51 with four finger-like projections or poles 55–58 which fit between deflection poles 12–15 as best seen in FIG. 6. The finger-like projections 55–58 are of like polarity and produce flux patterns of equal configurations and intensity. Permanent magnet 50 is ideally chosen to have a flux density which corresponds to the firing range of forward firing aircraft machine guns at their point of convergence. The effective flux of permanent magnet 50 is controlled by range coil 23 which is supported in annular channel 24, which is fastened to casing 11. Range coil 23 may add or substract from the constant flux of permanent magnet 50 through inner pole sections 26–29. The permanent magnet 50 eliminates the need for the other electromagnetic range coil used in prior gyroscopic systems of this type. This reduces heat buildup and produces an extremely accurate device which is fail-safe in that there is one less electromagnetic range coil which might malfunction and even if the remaining range coil 23 does not produce a flux, for example due to a malfunction, the device of the present invention would produce the desired lead for the normal range, e.g. the convergence point of the aircraft guns.

Figure 2:
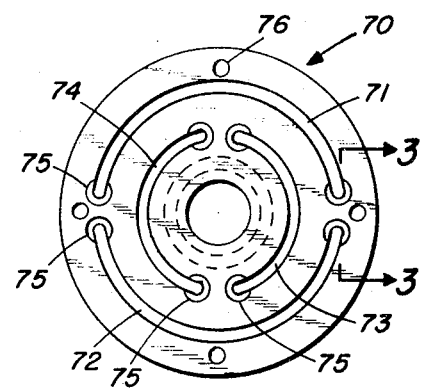
FIG. 2 is a plan view of the flexure plate.
Figure 3:
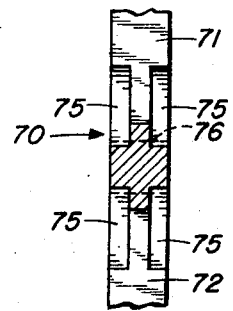
FIG. 3 is a cross-sectional view taken along line 3—3 of FIG. 2.
Figure 4:
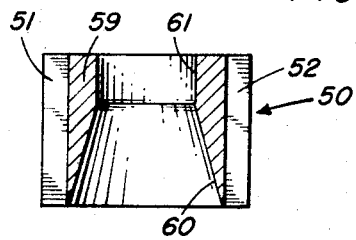
FIG. 4 is a cross-sectional view of the permanent magnet used in the present invention.
Figure 5:
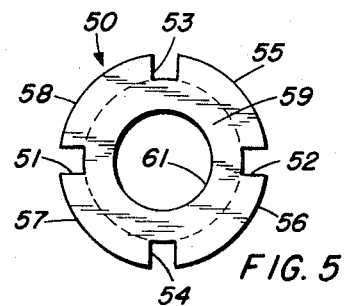
FIG. 5 is a top view of the permanent magnet as shown in FIG. 4.

Cylindrical member 29 is attached to the annular channel 24 and flexure plate 70 is mounted in the cylindrical member 29 by means of bolts 77. The flexure plate 70, as best seen in FIGS. 2 and 3, has outer semicircular slots 71 and 72 and inner slots 73 and 74. The inner slots 73 and 74 are disposed approximately 90° out of phase with respect to outer slots 71 and 72. Each end of each of the slots 71–74 have counterbores 75 at the ends thereof. The size and depth of counterbores 75, along with the material and thickness of plate 70 primarily determine the flexure qualities. The counterbores may be of equal or unequal depth or size on opposite sides of the plate for example. By drilling deep counterbores 75 the plate will flex more easily along pivotal flexure points 76, of cruciform cross-section as seen in FIG. 3.

A shaft 36 is rotatably mounted in bearings, one bearing 37 being within the cup-shaped member 34 and another bearing 38 being within the flexure plate 70. Shaft 36 has attached on one end a cup-shaped rotor 39, and a hysteresis ring 41, made of a material having a high hysteresis constant, for example a cobolt alloy, is attached to the inner periphery of the cup-shaped rotor 39. The cup-shaped rotor 39 is made of a non-ferromagnetic material, for example stainless steel. A mirror 42 is attached to the front face of the cup-shaped rotor 39.

An eddy-current disc 43 is attached to the other end of shaft 36 and is positioned in the air gaps between the inner and outer deflection poles.

In operation, the cup-shaped rotor 39 is rotated at a relatively high speed when current is applied to the field armature 35. Since the mirror 42 is attached to the front face of rotor 39, the mirror 42 will be rotated at the speed the rotor is rotating. Shaft 36 will also be driven by the rotor and consequently the eddy-current disc 43 will be spinning in the space between the inner and outer deflection poles. Current is also applied to the control coils 16–19, inclusive, and a magnetic field is produced. When this field is cut by the spinning disc 43, eddy-currents are produced in the disc. These eddy-currents are electrical currents which flow in small closed paths and the reaction of the field of these currents with the primary magnetic field creates forces which oppose the motion of disc 43. The magnitude of the eddy-current forces may be controlled by the strength of the magnetic field and by controlling the current applied to the control coils, thereby controlling the position of disc 43 in azimuth and elevation. As noted above, permanent magnet 50 sets the device at a predetermined range by selection of the proper flux therefor. The sensitivity of the device is then controlled by the amount of current applied to range coil 23.

When disc 43 is changed in position, mirror 42 will also be moved since shaft 36 physically connects mirror 42 and disc 43. Thus it can be seen that an image, such as a reticle pattern, can be deviated to provide for the proper lead necessary in the firing of a trajectory.

Obviously many modifications and variations of the present invention are possible in light of the above teachings. It is therefore to be understood that, within the scope of the appended claims, the invention may be practiced otherwise than as specifically described.

What is claimed is:

1. An eddy-current constrained gyroscope comprising:

a casing;

means for rotatably and pivotally mounting a shaft to said casing comprising a flexure plate having a first outer semicircular slot on one side of said plate;

a second outer semicircular slot on the otherside of said plate, said first and second outer semicircular slots being separated at the ends thereof by portions of said plate, a first inner semicircular slot on a first side of said plate, a second inner semicircular slot on a second side of said plate, said first and second inner semicircular slots being separated at the ends thereof by portions of said plate, said semicircular slots being counterbored at the ends thereof;

a hysteresis motor mounted within said casing having a stator attached to said mounting means and a rotor attached to said shaft;

a mirror attached to one face of said rotor;

an eddy-current disc attached to said shaft;

a permanent magnet for producing a magnetic field across the eddy-current disc; and a plurality of coils attached to said casing providing variable magnetic fields across the eddy-current disc to vary the magnetic field produced by the permanent magnet.

2. The device of claim 1 wherein a range coil further controls the magnetic field across the eddy-current disc.

3. The device of claim 1 wherein said permanent magnet is annular with four radially projecting poles thereon.

* * * * *